(12) United States Patent
O'Shaughnessy et al.

(10) Patent No.: US 9,866,768 B1
(45) Date of Patent: Jan. 9, 2018

(54) COMPUTER VISION QUALIFIED INFRARED TEMPERATURE SENSOR

(71) Applicant: The United States of America, as represented by the Secretary of Agriculture, Washington, DC (US)

(72) Inventors: Susan A. O'Shaughnessy, Amarillo, TX (US); Joaquin J. Casanova, Gainesville, FL (US); Steven R. Evett, Amarillo, TX (US); Paul D. Colaizzi, Amarillo, TX (US)

(73) Assignee: The United States of America, as represented by The Secretary of Agriculture, Washington, DC (US)

( * ) Notice: Subject to any disclaimer, the term of this patent is extended or adjusted under 35 U.S.C. 154(b) by 465 days.

(21) Appl. No.: 14/263,451

(22) Filed: Apr. 28, 2014

Related U.S. Application Data

(60) Provisional application No. 61/816,900, filed on Apr. 29, 2013.

(51) Int. Cl.
*G01J 5/00* (2006.01)
*G01N 25/00* (2006.01)
(Continued)

(52) U.S. Cl.
CPC ............ *H04N 5/33* (2013.01); *H04N 5/2252* (2013.01); *H04N 5/23216* (2013.01)

(58) Field of Classification Search
CPC .......... G01J 5/00; G01N 25/00; A01G 25/16; A01G 25/167; Y10T 137/189; Y10T 137/1963; Y10T 137/7287
(Continued)

(56) References Cited

U.S. PATENT DOCUMENTS

| 4,755,942 A * | 7/1988 | Gardner | A01G 25/16 47/1.01 R |
| 5,386,117 A * | 1/1995 | Piety | G01N 25/72 250/330 |

(Continued)

FOREIGN PATENT DOCUMENTS

CN 101960963 A * 2/2011

*Primary Examiner* — Gail Kaplan Verbitsky
(74) *Attorney, Agent, or Firm* — John D. Fado; Robert D. Jones

(57) ABSTRACT

Plant canopy images and temperature are acquired with a wireless computer vision instrument, and the temperature data are qualified and pixels within the image are classified. The instrument includes sensors for measuring plant radiation due to canopy temperature and an imaging sensor which collects data over four bands, a microprocessor to receive and store and process measured data from the sensors, and a wireless transmitter for transmitting data from the microprocessor to a remote receiver. The data are used to detect plant stress and canopy cover percentage and to qualify temperature data accordingly. The data from the sensors provide information for decision support algorithms related to the initiation of automatic irrigation scheduling as a function of crop canopy cover and water stress, the qualification of temperature data used in automatic irrigation scheduling algorithms, and the detection of diseased crops for the purpose of withholding irrigations when yield potential is compromised.

8 Claims, 2 Drawing Sheets

(51) Int. Cl.
*H04N 5/33* (2006.01)
*H04N 5/232* (2006.01)
*H04N 5/225* (2006.01)

(58) Field of Classification Search
USPC ............ 374/121, 1, 100, 16, 45; 700/284
See application file for complete search history.

(56) References Cited

U.S. PATENT DOCUMENTS

| | | | | |
|---|---|---|---|---|
| 5,576,553 A * | 11/1996 | Adachi | | G01J 5/522 250/495.1 |
| 5,981,958 A * | 11/1999 | Li | | G01N 21/6408 250/459.1 |
| 6,188,079 B1 * | 2/2001 | Juvinall | | G01B 11/06 250/223 B |
| 7,315,377 B2 * | 1/2008 | Holland | | G01J 3/02 250/226 |
| 7,580,549 B2 * | 8/2009 | Wei | | A01B 69/001 382/104 |
| 7,809,475 B2 * | 10/2010 | Kaprielian | | A01C 23/042 137/78.3 |
| 8,993,847 B2 * | 3/2015 | Allen | | C12N 9/88 800/295 |
| 9,195,891 B2 * | 11/2015 | Scharf | | G06K 9/00657 |
| 2005/0098713 A1 * | 5/2005 | Holland | | G01J 3/10 250/221 |
| 2007/0014434 A1 * | 1/2007 | Wei | | A01B 69/001 382/104 |
| 2007/0051884 A1 * | 3/2007 | Romanov | | G01D 5/2495 250/231.13 |
| 2013/0044919 A1 * | 2/2013 | Purcell | | G01N 21/25 382/110 |
| 2014/0139717 A1 * | 5/2014 | Short | | H04N 7/142 348/333.1 |
| 2014/0169400 A1 * | 6/2014 | Baarman | | A61B 5/01 374/45 |
| 2014/0176735 A1 * | 6/2014 | Short | | H04N 1/00267 348/207.1 |
| 2015/0062346 A1 * | 3/2015 | Fraden | | H04N 5/23267 348/164 |
| 2015/0324989 A1 * | 11/2015 | Smith | | G06T 7/0026 382/278 |
| 2016/0156880 A1 * | 6/2016 | Teich | | H04N 5/225 348/82 |
| 2016/0171059 A1 * | 6/2016 | Diamond | | G06Q 30/02 707/722 |

* cited by examiner

COMPUTER VISION QUALIFIED INFRARED TEMPERATURE SENSOR

REFERENCE TO RELATED APPLICATIONS

This application claims the benefit of U.S. Provisional Application No. 61/816,900, filed Apr. 29, 2013, which is incorporated herein by reference in its entirety.

BACKGROUND OF THE INVENTION

Field of the Invention

The invention is drawn to a method and apparatus for acquiring digital images and composite surface temperature measurement of the image and managing irrigation.

Description of the Prior Art

Computer vision technology refers to image acquisition and image data processing and analysis. Image processing algorithms are developed for pattern recognition, feature extraction, and classification. Computer vision sensors contain an imaging sensor that converts light into digital values representing light intensity and color. Pixels refer to the smallest addressable area of an image and can be represented by a vector of red (R), green (G), blue (B) and near-infrared (NIR) intensity values and possibly additional components depending on the capabilities of the sensor used. Color indices may be used to segment an image of a crop with a background of soil into vegetation and soil by calculating a single index using the RGB values for each pixel [Wobbecke et al. 1995. Color indices for weed identification under various soil, residue, and lighting conditions. Trans. of the ASAE. 38(1):259-269]. The advantage of using computer vision is that evaluation of the algorithms is simpler to assess, since one can review the image and validate the results using alternative software packages.

Imaging sensors used in computer vision are typically cameras. Xue et al. (2012. Variable field-of-view machine vision based row guidance of an agricultural robot. Computers and Electronics in Agric. 84:85-91) used a low cost digital camera (Logitech QuickCam) connected to a laptop computer as part of their robotic agricultural platform to acquire and process images for the purposes of guiding the platform through a corn field. Guidance was based on distinguishing between corn plants and soil using color segmentation and preset thresholds, but the algorithm describing the segmentation was not disclosed.

Recent image analysis used in agricultural applications to segment plant from soil and residue include works by Golzarian et al. [2012. Evaluation of color indices for improved segmentation of plant images. Transactions of the ASABE. 55(1):261-273], Burgos-Artizzu et al. (2010. Analysis of natural image processing for the extraction of agricultural elements. Image and Vision Computing. 28:138-149), Zheng et al. (2009. Mean-shift-based color segmentation of images containing green vegetation. Computers and Electronics in Agric. 65:93-98), and Marchant et al. (2001. Evaluation of an imaging sensor for detecting vegetation using different waveband combination. Computers and Electronics in Agric. 32:101-117). These researchers used different approaches to extract features and classify pixels. Golzarian et al. (2012. ibid) determined that the hue color index was effective in segmenting plant from soil and residue background using computer vision under different lighting and background conditions for each pixel, j:

eq. [1]
$$Hue = \arctan\left(\frac{(g-b)\sqrt{3}}{(r-g)+(r+b)}\right)$$

where arctan is the 360° arctangent function, and r, g and b, are scaled references derived from equation 2a,b,c:

eq. [2]
$$r_j = \frac{R_j}{R_j + G_j + B_j}; \quad (a)$$

$$g_j = \frac{G_j}{R_j + G_j + B_j}; \quad (b)$$

$$b_j = \frac{B_j}{R_j + G_j + B_j} \quad (c)$$

where $R_j$, $G_j$, and $B_j$ are the red, green and blue color values of the captured reflected light recorded for each pixel j. Image segmentation by Burgos-Artizzu et al. (2010. ibid) was accomplished by converting digital RGB images into grey level images, and then using a classic threshold method to classify the data into a binary image where white pixels represented vegetation and black pixels represented non-vegetation. Zheng et al. (2009. ibid) extracted hue and saturation, and red, green, and blue values and then used the mean shift procedure and a back-propagation neural network method to segment the digital image into green vegetation and background. Marchant et al. (2001. ibid) used a digital camera and filters to produce images from three bands—red, green and NIR. Their classification method was based on simple ratios of the three different bands, and receiver operator characteristic curves.

Image analysis has also been used to identify diseased plants. Camargo and Smith (2009. An image-processing based algorithm to automatically identify plant disease visual symptoms. Biosystems Engr. 102:9-21) used RGB image processing to identify visual symptoms of plant disease. Their algorithm for image segmentation was based on Hue Saturation Value (HSV) and linear transformation of RGB to the I1I2I3 color space using methods by Ohta et al. (1980. Color information for region segmentation. Computer Graphics and Image Processing, 13:222-241).

The primary method of ground-based remote crop water stress detection has been through the use of infrared thermometers. A functional wireless infrared thermometer (IRT) was developed separately (O'Shaughnessy et al. 2011. Evaluation of a wireless infrared thermometer with a narrow field of view. Computers and Electronics in Agric. 76:59-68). The wireless sensor network was established in a topology similar to that described by O'Shaughnessy and Evett [2010. Appl. Engr. In Agric. 26(2):331-341] for an earlier wireless IRT prototype. However, thermal measurements obtained using radiometric sensors usually contain the temperatures of both vegetation and soil. Since soil temperature is often different from vegetation, it is important to determine the percent vegetation within the field-of-view (FOV) of the IRT.

Accurate plant stress sensing is critical for effective deficit irrigation management where errors in stress sensing may translate into declines in yield and harvest quality that render deficit irrigation management untenable for producers. This is important because deficit irrigation is one of the best ways to increase crop water use efficiency (WUE)—producing more or the same amount of yield with less water—and so is a key response to climate change in agriculture. However, there is currently no equipment that accurately and precisely determines the surface temperature while at the same time qualifying the data as to surface type, whether that be soil, plant, diseased plant or a water-stressed plant.

SUMMARY OF THE INVENTION

We have invented a novel wireless computer vision instrument (hereinafter referred to as "instrument") with a thermal band (referred to hereinafter as CVIRT) that automatically acquires an image of plant canopy and background material and the composite temperature of the image, and a process to calculate the percent soil, shadow, and vegetation pixels, qualify the temperature data, and classify the status of the vegetation for irrigation management. The instrument of this invention comprises sensors for acquiring a digital image in the visible and near infrared bands, a sensor for acquiring thermal data, and a wireless transmitter for transmitting data from the microprocessor to a remote receiver. A housing is provided, enclosing all of the sensors, microprocessor and wireless transmitter. The IRT measures surface temperature remotely using a narrow field of view thermal infrared (IR) sensor, and a digital imaging sensor simultaneously acquires an image in the red (R), green (G) and blue (B) color values and the near infrared (NIR) band for the purposes of qualifying the sensed temperature for use in irrigation scheduling and control (FIG. 1). The image is realized using an embedded camera sensitive in the desired bands and focused so as to have a view coincident with the view of the thermal IR sensor. This instrument can be outfitted with a GPS module and utilized as a hand-held sensor to provide spatial information while moving across a cropped field or other surface, or it can be deployed as part of a network of sensors located in the cropped field or positioned on a moving sprinkler irrigation system.

The invention also relates to a novel process to qualify temperature data based on percent soil, shadow, and vegetation pixels within the FOV of the thermal infrared sensor. The data from the sensors provide information for decision support algorithms related to the initiation of automatic irrigation scheduling with the qualified temperature data used in automatic irrigation scheduling algorithms and the detection of diseased crops for the purpose of withholding irrigations when yield potential is compromised.

In the process, at least one instance of thermal data and a digital image (comprised of RGB and NIR data) are acquired for each irrigation management zone (control area) and processed using either the included microprocessor or a remote microprocessor-based computer control unit. The acquired image is processed at the microprocessor level of the instrument to determine hue of each pixel, and calculate percent soil, percent vegetation, percent healthy vegetation, and percent diseased vegetation. In this embodiment, the evaluation of the pixel data to determine if they were collected from soil or plant canopy comprises determining the ratio (an area-weighted ratio) of the data (number of pixels) from soil to data (number of pixels) from plant canopy. If the ratio is greater than a predetermined threshold value (between 0 and 1), irrigation may be optionally withheld due to a lack of plant cover. The particular threshold value selected is variable, and may be determined by the irrigation operator or grower in consideration of factors such as water availability and irrigation cost. If the data collected are classified as being from vegetation, then the thermal temperature data from the IRT is qualified based on the fraction of vegetation, soil, and shadow within the field of view of the IRT. The mean $hue_{veg}$ is evaluated to determine if the plants are disease-stressed. If the measured plants are not diseased then the crop water stress is determined using a separate algorithm. A variety of algorithms are suitable for use herein, although a preferred algorithm is described in Evett et al. (U.S. patent application Ser. No. 13/403,091, filed Feb. 23, 2012, the contents of which are incorporated by reference herein),If water-stressed, irrigation is indicated and/or initiated. If diseased, irrigation may be withheld. Area weighting is applied if the speed of the irrigation system over the ground changes as the sensor passes over a management zone. In a preferred embodiment, the CVIRT instruments are mounted on a moving irrigation system, and the temperature and images are collected multiple times as it passes over each irrigation management zone. This process is repeated for each management zone subject to irrigation for which data are collected.

In accordance with this discovery, it is an object of this invention to provide an improved stand-alone instrument consisting of a camera for acquiring images in the NIR range, and red, green, and blue color values, an infrared thermometer for measuring plant canopy temperature, a microprocessor, algorithms embedded in firmware and wireless transmitter, all contained within a single integrated unit.

It is another object of this invention to provide an improved stand-alone instrument effective for measuring all of plant canopy temperature and recording a digital image in the NIR, red, green, and blue bands, storing the data in a microprocessor, and wirelessly transmitting the data to a receiver at a remote location.

It is also an object of this invention to provide an improved process for managing irrigation with reduced false positive irrigation scheduling and increased efficiency and cost efficacy of irrigation as it relates to successfully increasing plant yields per unit of water applied.

It is a further object of this invention to provide an improved process for managing irrigation wherein temperature data are qualified as originating from soil surface or plant canopy, diseased plant vs. healthy plants, and water-stressed plants vs. non-water-stressed plants.

Other objects and advantages of the invention will become readily apparent from the ensuing description.

DETAILED DESCRIPTION OF THE INVENTION

Figure 1:
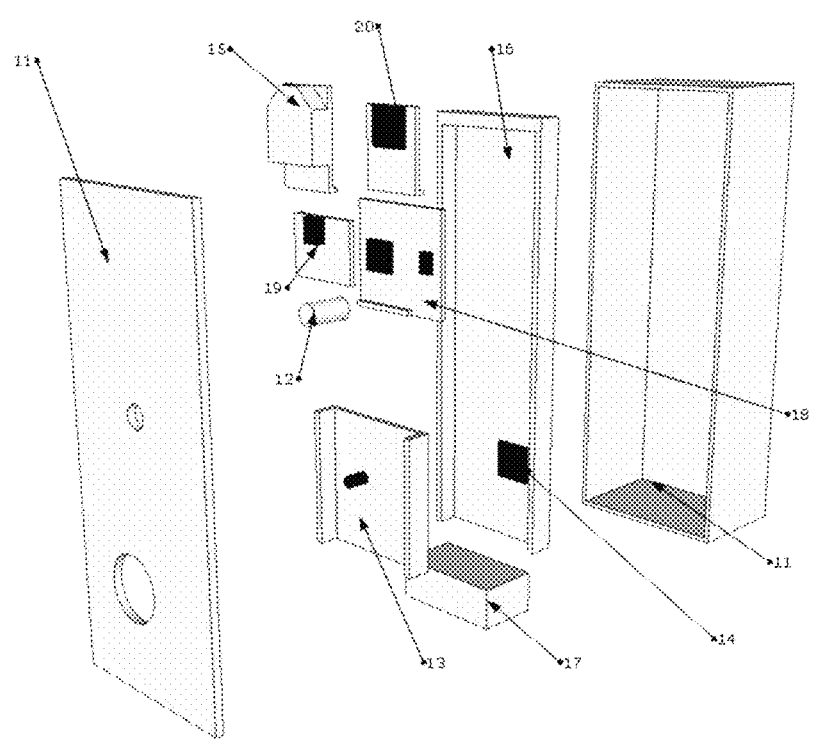
FIG. 1 shows a design of the wireless instrument in accordance with a preferred embodiment.

The instrument herein was designed as a single, self-contained unit with an infrared (IR) thermometer for making measurements of plant canopy temperature and a camera acquiring digital images in the NIR range (NIR pass filter), red, green and blue color values (which images provide data representative of the reflected light in all of the NIR, red, green and blue bands). The instrument is capable of processing the R, G, B, NIR and thermal IR intensity data using a microprocessor, storing the data in computer memory and wirelessly transmitting the data to a receiver at a remote location. As shown in FIG. 1, the instrument includes a housing or casing (11) of sufficient size as to contain all of the components therein. The housing may be constructed from a variety of materials, but should be weather-proof to prevent damage to the detectors therein. In a preferred embodiment, the housing is constructed from two or more pieces of rigid sunlight resistant plastic for ease of access.

Plant canopy (or soil) surface temperature is effectively measured with an infrared thermometer or IRT (12), which is sensitive to IR radiation in the thermal range, between about 5 to 14 µm wavelength. In general, the field of view (FOV) of the IRT and imaging sensor should be substantially coincident, and preferably match as nearly as possible. A variety of IR thermometers are known in the art and are suitable for use herein, including those described by Wood and Scharf (U.S. Pat. No. 4,998,826) or O'Shaughnessy et al. (2011, Computer and Electronics in Agric., 76:59-68), the contents of each of which are incorporated by reference herein. In a preferred embodiment, the IRT comprises a thermal IR thermopile detector chip (5.5-14 µm) with an attached collimating filter/lens to reduce the field of view. A particularly preferred IRT for use herein is the model MLX90614-BCF IRT manufactured by Melexis (Leper, Belgium). This field of view IRT nearly matches that of the imaging sensor and is particularly preferred for measuring row crops at oblique angles when the computer vision instruments are mounted on a moving platform such as a moving irrigation system. The digital image of the plant canopy and soil background is effectively acquired by an embedded sensor. A variety of embedded imaging sensors are known in the art and are suitable for use herein, including those described by Strojwas. 1986. Design and Test of Computers, IEEE. 3(1):35-44. In a preferred embodiment, the imaging sensor (13) is a fully programmable module with medium storage capabilities. A particularly preferred sensor is the CMUcam4 manufactured by Lextronic (Paris, France).

A microprocessor unit (14) is provided in communication with the thermal IR and imaging sensor to receive, store and process data signals therefrom. Communication with the sensors may be effected using conventional interface hardware. In a preferred embodiment, the microprocessor 14 is also effective to compute and store periodic time averages of the temperature and pixel data (percent vegetation, soil, shadow pixels, and mean vegetation hue value). The microprocessor may also function to convert analog data to digital form if necessary (if the sensor output is an analog signal), or this conversion may be conducted by a conventional analog/digital converter. A wireless transmitter (15) (a radio frequency or RF module) is provided in communication with the microprocessor to receive the stored data (or time averages) therefrom and transmit this data signal to a receiver at a remote location, such as a microprocessor-based computer control or data logger base station unit. It is understood that the computation of hue, mean hue of vegetation pixels, percent vegetation, percent soil, and percent shadow may also be determined by the remote microprocessor. The particular microprocessor and wireless transmitter used are not critical, and each may be obtained from commercial sources. However, without being limited thereto, wireless transmitters operating under the 802.15.4 IEEE open communication standard (Zigbee) are preferred. Each of the microprocessor and wireless transmitter are shown as mounted on board (16) disposed within housing (11). Either the microprocessor 14 or the remote microprocessor may be further programmed or provided with software effective for performing the additional steps of the algorithm described herein. Specifically, the microprocessor may be programmed to compare the percent vegetation, soil and shadow to predetermined thresholds, classify the data as soil or vegetation, qualify the measured temperature data, determine if the vegetation is diseased or healthy, and evaluate water stress from the qualified temperature data. At least one signal generator may be provided in communication with the microprocessor, which is effective for generating and displaying an irrigation signal when the plants are determined as being water-stressed. Signals may include audible alarms, visible beacons, lights or LEDs, printouts or any combination thereof.

Power for operation of the detectors, microprocessor and wireless transmitter may be provided by electrical power supply (17), which may also be disposed within housing (11). A variety of power sources are suitable for use herein, although typically power will be supplied using onboard batteries, capacitors or combinations thereof. In a preferred embodiment, the power supply will include an optional solar cell or panels (not shown) to recharge the batteries. It is also understood that power may be provided by other conventional external sources, including generators, wind generators and AC electrical connections, or by less conventional sources including energy harvesting devices and wireless power transmission device. For example, a suitable energy harvesting device may include a conventional kinetic energy to power converter for charging the battery or capacitor. In this embodiment, the movement of the unit as it traverses a field may be exploited to power the components. A variety of known kinetic energy to power converters are suitable for use herein. For example, without being limited thereto, the converter may include a magnet movable through a wire coil. As the device moves, the magnet repeatedly passes back-and-forth through the coil, generating an electric current used to charge the battery or capacitor.

The instrument may be used as a hand held sensor for measuring crop canopy temperature and acquiring digital images of the crop canopy. In this embodiment an optional satellite positioning system receiver (GPS module) (18) may be provided to provide spatial information while transecting a cropped field. However, in a preferred embodiment, at least one but preferably a plurality of the sensors are disposed on a moving irrigation system or dispersed at stationary locations in the field to be irrigated to collect plant canopy (or soil) data in the desired control areas. Without being limited thereto, the IRT should have a field of view, e.g., between about 10 to 20°, to provide a spot size that includes a portion of the canopies of several plants but does not extend above the horizon and does not extend downward so as to include appreciable soil surface in the spot when mounted above the surface and aimed at a downward oblique angle (approximately 45° below the horizontal), and should allow correction for ambient temperature conditions. In a preferred embodiment, two instruments are aimed at the control area from nearly opposite sides of the area in order to reduce sun angle effects on measured surface temperature.

Each acquired image can be processed or segmented using hue thresholds for classes of interest, i.e. soil, plant, and shadow, and if plant, healthy or diseased. In a preferred embodiment, the threshold values for each class are determined using the expectation maximization (EM) statistical algorithm, which provides a technique for discriminating between different data types. EM algorithms estimate parameters (mean, standard deviation, and mixing probability) in a model from measured data, in the presence of "hidden variables", namely, classes (such as soil and vegetation), by maximizing the log-likelihood of the observed data. The form for the maximum log likelihood expression can be found in Moon [1996. Signal Processing Magazine, IEEE 13(6):47:60]. The EM algorithm is applied to distribute the hue values, x, for images of interest into Gaussian functions ($func_i$) for each class i ∈ (vegetation, soil, and shadow):

eq. [3]

$$func_i = \sum_{i=1}^{3} \frac{\rho_i}{\sqrt{2\pi\sigma_i}} \exp\left(\frac{(x-\mu_i)^2}{2\sigma_i^2}\right)$$

where $p_i$ is the fraction of pixels, $\sigma_i$ is the standard deviation, and $\mu_i$ is the mean hue value for each class i. The mean hue for each class can be determined from the μ associated with the appropriate function, which can be visually qualified from the histograms produced. Because hue is modulo 360°, the threshold values are reported as a range of values. Digital images of each species of crop of interest (healthy and diseased) with soil and shadow in the background can be used to establish a library of hue thresholds for healthy and diseased plant, soil, and shadow.

Library values of hue thresholds can be used to segment digital images by classifying each pixel in the image as plant, soil or shadow, and if plant, healthy or diseased. The microprocessor maintains a total count of each class of pixels as well as the total number of pixels within the thermal infrared sensor's field of view. Thereby, for each image, the percent plant ($f_p$), soil ($f_s$), and shadow ($f_g$) can be calculated as the ratio of the number of pixels in each class to the total number of pixels within the thermal infrared sensor's field of view. The mean hue of the vegetation pixels (mean $HUE_v$) can be calculated as the average hue for all plant pixels in the image.

Plant temperature ($T_p$) can be adjusted (qualified) using measurements from the thermal infrared sensor's field of view ($T_{IRT}$) and the Stefan-Boltzmann relationship between radiation and temperature:

eq. [4]

$$T_p = \left[\frac{(T_{IRT}^4 - f_s T_s^4 - f_g T_g^4)}{f_p}\right]^{1/4}$$

where $T_s$, soil temperature, is estimated using the soil thermal conductivity equation at the surface layer: $T(0,t) = T_{ave} + A_0 \sin \omega t$ (where $T(0,t)$ is the temperature at the soil surface as a function of time, t, $T_{ave}$ is the average temperature of the surface, $A_0$ is the amplitude of the surface temperature fluctuation, and ω is the radial frequency, (Van Wijk and Derksen. 1963. Periodic temperature variation in a layered soil. In Van Wijk, W. R., ed., *Physics of Plant Environment*. Amsterdam: North Holland, pp. 102-143; Hillel. 1998. Environmental Soil Physics. 2nd edn., San Diego: Academic Press, p. 324), $f_s$ is the percent soil, $f_g$ is the percent shadow, $f_p$ is the percent plant in the field of view of the thermal infrared sensor, and $T_g$ is shadow temperature. $T_g$ is solved using a three-source energy balance model similar to the two source energy balance model used by Colaizzi et al. (2012. Two-source energy balance model estimates of evaporation using component and composite surface temperatures. Advances Water Res. 50:134-151, the contents of which are incorporated by reference herein) where the third source is shadow, and solved iteratively.

The instrument and process described herein may be used for collecting temperature and pixel data from an image and managing irrigation or watering of a variety of plants, particularly agronomically important field crops, vegetables, fruits and fruit trees, turf grass, golf courses, urban landscapes and horticultural crops. Without being limited thereto, examples of plants which may be managed using this invention include sorghum, cotton, corn, wheat, beans, soybeans, peppers, cucumbers, tomatoes, potatoes, peach trees, orange trees, almond trees, pecan trees, olive trees, roses and petunias. It is also envisioned that the invention may be used in a variety of climates, with any production system or any type of irrigation system, including stationary irrigation systems and particularly field traversing irrigation systems such as a center pivot system. In addition to its application in arid and semi-arid regions, the invention may be used in non-arid or humid regions to identify the need for supplemental irrigation, or even for managing watering in greenhouses. Irrigation systems of particular interest which may be used with this invention include, but are not limited to, drip, sprinkler, LEPA [low energy precision application, as described by Lyle and Bordovsky (1981. Trans ASAE. 24:1241-1245), and Bordovsky and Lyle (1988. ASAE Paper no. 88-2097. ASAE. St. Joseph, Mich.), the contents of each of which are incorporated by reference herein], and flood irrigation.

Figure 2:
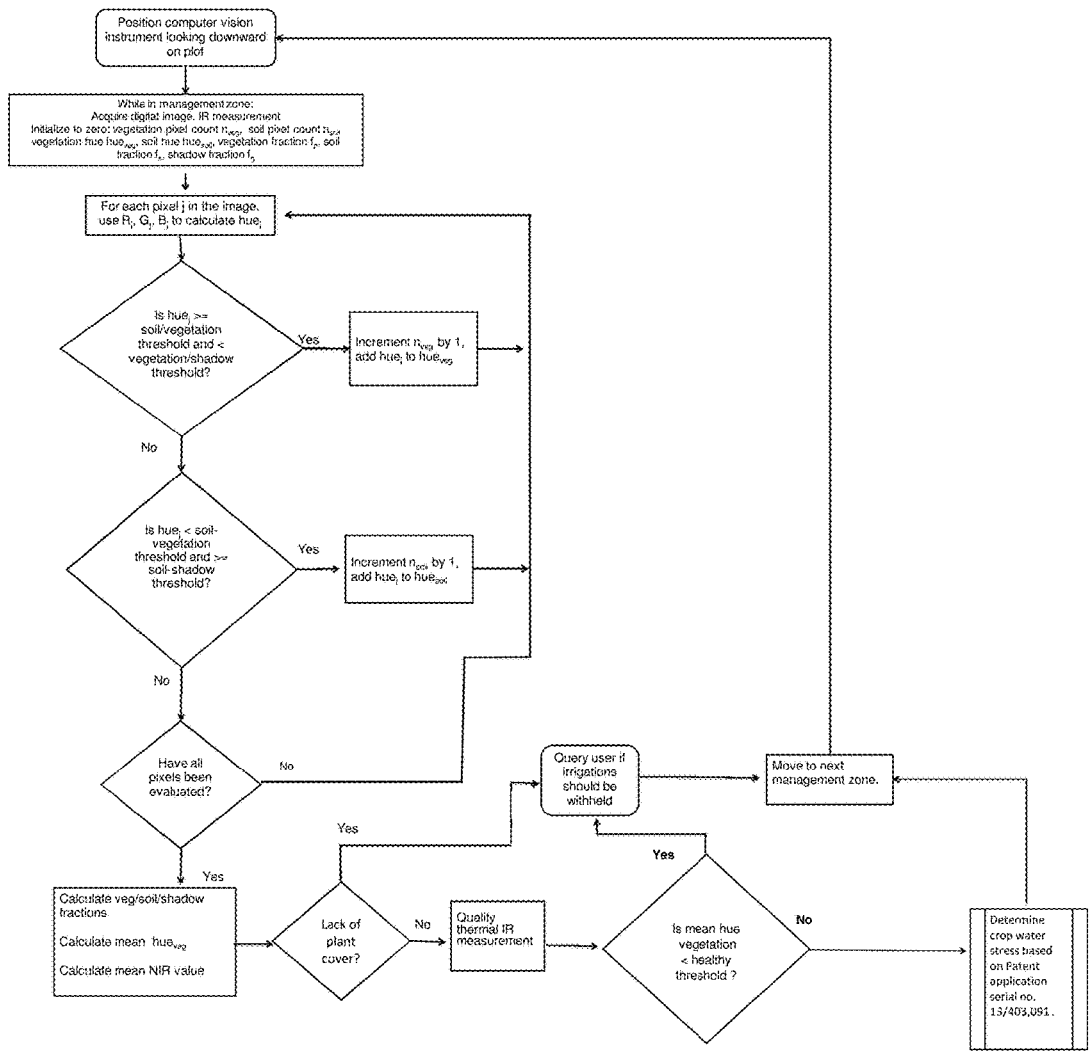
FIG. 2 shows an algorithm flowchart that combines the qualification of thermal measurements with disease detection for irrigation scheduling and control. This embodiment specifically illustrates the decision making process as sensors mounted on a moving irrigation system measure a management zone j.

A preferred embodiment of the process for the collection of temperature measurements and images, analysis of the data, and managing irrigation is shown in FIG. 2. In general, prior to irrigation control, a library of hue threshold values between vegetation, soil, and shadow classes are prepared from images containing crops of interest (healthy and diseased), soil, and shadows that may be viewed by the instrument in a field setting. During subsequent use for irrigation management, each measurement made at time t by the instrument produces a multidimensional vector ($T_{pt}$, $NIR_t$, mean $HUE_{vt}$, $f_{pt}$, $f_{st}$, and $f_{gt}$) representing, respectively, qualified plant temperature, mean NIR value, mean of hue calculated from equation 1 and classified as plant pixels, and ratio of vegetation, soil and shadow pixels to the total number of pixels and classified using library hue thresholds, all at time t.

By way of example and without being limited thereto, averages of the hue values to segment images into plant, soil, and shadow are shown for images acquired while viewing samples of wheat and cotton plots with a prototype wireless instrument using a nadir looking view angle (Table 1).

TABLE 1

Example library of hue thresholds from EM analysis of field images.

| Year | DOY | Soil/Vegetation | Shadow/Soil | Vegetation/Shadow |
|------|-----|-----------------|-------------|-------------------|
| Wheat | | | | |
| 2011 | 130 | 250.49 | 193.59 | 8.39 |
| 2011 | 137 | 247.63 | 177.49 | 347.43 |
| 2012 | 117 | 257.08 | 183.38 | 0.06 |
| Cotton | | | | |
| 2012 | 181 | 234.07 | 201.64 | 35.79 |
| 2012 | 201 | 260.14 | 193.78 | 6.77 |
| 2012 | 208 | 268.47 | 173.86 | 352.83 |
| 2012 | 221 | 266.00 | 178.50 | 1.72 |

The library of mean hue threshold values is determined by calculating the hue value (x) for each pixel within an image using Equations 1 and 2. Then the EM algorithm is applied to distribute the hue values for vegetation, soil and shadow into three Gaussian functions using equation 3. The optimal threshold between two classes i and j (Table 1) is determined by solving equation 5 for the hue value x:

eq. [5]
$$\frac{(x-\mu_i)^2}{2\sigma_i^2} - \frac{(x-\mu_j)^2}{2\sigma_j^2} = \ln\left(\frac{\sigma_j \rho_i}{\sigma_i \rho_j}\right)$$

Vegetation hue values are further categorized as healthy or diseased using preset thresholds from a second library of mean hue thresholds taken from images over healthy vs. diseased vegetation plots with a prototype wireless imaging sensor using a nadir looking view angle (Table 2).

TABLE 2

EM-derived seasonal averages of vegetation hues/threshold values for wheat.

| Treatment Irrigation Level | Mean hue values | | |
|---|---|---|---|
| | $I_{33\%}$ | $I_{67\%}$ | $I_{100\%}$ |
| Healthy | 272 | 277 | 280 |
| Diseased | 270 | 276 | 277 |

As an example, a pixel is classified as soil if the hue value $\epsilon$ [11-179°], as shadow if the hue value $\epsilon$ [180-250°] or as vegetation if its hue value $\epsilon$ [251-10°]. If the crop is well watered and the mean hue of the vegetation pixels is less than 278.5 the vegetation is classified as diseased.

The library of hue thresholds is used in the decision making algorithm for irrigation control for each management control zone growing the selected plant or crop of interest. The library may also be used in construction of maps showing information useful for management such as spatial representations of percent plant cover, canopy temperature, soil temperature, diseased areas, water stressed areas and the like.

Referring again to the preferred embodiment shown in FIG. 2, in operation, the temperature and digital image in the NIR, red, green and blue bands is acquired at time t, and the red, green and blue color values (R, G and B) for each pixel are determined. These values of R, G and B are then used to calculate the hue at each pixel of the image at that time t, as described above. The calculated hue values at each pixel are compared to the above-mentioned thresholds and thereby classified as vegetation, soil or shadow. This is repeated for each pixel of the image, and the fractions of pixels identified as vegetation ($f_p$), soil ($f_s$) and shadow ($f_g$) (as a fraction of the total number of pixels) are calculated, as well as the mean hue of the pixels identified as vegetation and mean NIR values. If the soil fraction relative to the vegetation fraction is greater than a predetermined threshold value (between 0 and 1), irrigation may be optionally withheld due to a lack of plant cover. The particular threshold value selected is variable, and may be determined by the irrigation operator or grower in consideration of factors such as water availability and irrigation cost. Conversely, if the soil fraction relative to the vegetation fraction is less than the predetermined threshold value, then the temperature measurement data from the IRT are qualified (i.e., $T_{pt}$) at that time t in accordance with equation 4. A weighted average of diseased versus healthy plant data is calculated, and if the measurement is classified as diseased (a given, user controlled from the mean hue of the vegetation, percentage of the management zone data are indicated as diseased) then irrigation may be withheld. The process is repeated for each management zone. However, if a weighted average of diseased versus healthy plant data is classified as healthy, then $T_{pt}$ will be used in the mean calculation of crop canopy temperature and the management of irrigation. Similarly, if a weighted average of data identified as soil versus plant cover surpasses a threshold value, then irrigation may be withheld due to lack of plant cover.

Once the image has been segmented into percent vegetation, soil, and shadow pixels, the vegetation temperature is qualified, and the mean vegetation hue value is calculated and categorized as either healthy or diseased. The determination if the plants are water-stressed or non-water-stressed based on the qualified plant canopy temperature, and the subsequent decision to indicate or initiate irrigation, may be conducted using a variety of techniques or algorithms. A number of techniques for control of irrigation based upon the determination of crop water stress have been previously described and are also suitable for use herein. However, in a preferred embodiment, the determination of water-stress and the irrigation signal generation or the initiation of irrigation are conducted using the process described by Evett et al. (U.S. patent application Ser. No. 13/403,091, filed Feb. 23, 2012, the contents of which are incorporated by reference herein.

In use, the instrument will typically operate continuously with data samples made at regular intervals. Although the data can be transmitted directly to the base station computer unit, in a preferred embodiment the image will be processed by the microprocessor and time averaged values of the qualified temperature, percent healthy vegetation pixels, and percent diseased vegetation pixels are computed and stored by the on-board microprocessor. The sampling frequency and data averaging frequency may be selected by the user. By way of example, 5 minute averages may be computed, time-stamped using a real-time clock (19), and stored in the memory card (20) on board (16). The time averaged values are periodically transmitted to the base station computer or data logger. Sampling frequency, data management concerning temperature qualification, data averaging, and frequency of transmission to the base station computer or data logger are controlled with firmware coding. The data are collected at the base station computer. For automatic irrigation control applications, a separate microprocessor based computer control unit having conventional interface hardware is provided at the base station for receiving and interpreting the signals from the instrument. A suitable microprocessor will include hardware and/or software for recording surface radiometric data, and processing the calculations therefrom in accordance with the method described herein. Image classification paired with the concurrent temperature measurements will allow for real-time irrigation decision making. One or more signal generators may be provided in communication with the base station computer control unit microprocessor, which is effective for generating and displaying an irrigation signal when the plants are water-stressed and irrigation is indicated. Signals may include audible alarms, visible beacons, lights or LEDs, printouts or any combination thereof. Although irrigation may be manually actuated by the producer in response to the above mentioned signals, the base station computer control unit may include optional control means for automatically actuating irrigation. Suitable control means should include appropriate electronic circuitry effective for actuating the particular irrigation device in response to the microprocessor, including transmission of variable rate irrigation instructions whereby irrigation application depth may be varied in time and space. In accordance with this embodiment, automatic control means may replace or be used in conjunction with the signal generator.

It is understood that the foregoing detailed description is given merely by way of illustration and that modifications and variations may be made therein without departing from the spirit and scope of the invention.

We claim:

1. A method for managing the irrigation of plants comprising the steps of:
    a) providing a computer vision instrument in the vicinity of vegetation within a target control area subject to irrigation; the computer vision instrument comprising an infrared thermometer (IRT), and a digital camera for image acquisition, the digital camera detecting red, green, blue or near infrared light, wherein said IRT and said digital camera have substantially coincident fields of view;
    b) utilizing said digital camera for collecting a digital image comprising the near infrared, red, green and blue bands in said target control area, and using the IRT to collect a temperature measurement;
    c) said digital camera communicating with a microprocessor, said microprocessor calculating a hue of each pixel of the digital image and classifying each pixel as soil or vegetation;
    d) repeating step c) for all pixels in the digital image; and
    e) comparing the percent vegetation in the digital image to a predetermined percent vegetation threshold value to classify the digital image data as vegetation or soil, said predetermined percent vegetation threshold value comprising a subjective value/decision by an irrigation operator based on at least water availability and irrigation cost; and
    1) if the data are from vegetation, calculating a mean hue of the vegetation, and evaluating the mean hue of the vegetation to determine if the vegetation is diseased or healthy;
    2) if the vegetation is diseased, optionally withholding irrigation;
    3) if the vegetation is healthy, using qualified plant (for example vegetation) temperature data to determine if the vegetation is water-stressed wherein said qualified vegetation temperature is calculated by obtaining an estimate of the soil temperature, Ts; and shadow temperature, Tg; further evaluating a digital image data to determine a percent shadow in the image, fg; a percent soil in the image, fs; and a percent vegetation, fp in the image; and calculating the qualified vegetation temperature, Tp, as $$T_p = \left[ \frac{(T_{IRT}^4 - f_s T_s^4 - f_g T_g^4)}{f_p} \right]^{1/4}$$

wherein $T_{irt}$ is the temperature measured by the IRT;
    4) based on the Tp value calculated in step 3), determining if the vegetation is water-stressed; and,
    5) generating an irrigation signal if the vegetation is water-stressed.

2. The method of claim 1 wherein said irrigation signal is an audible or visible signal.

3. The method of claim 1 further comprising generating a map comprising a visual representative of areas of healthy plants, diseased vegetation, soil, percent vegetation cover, water stressed vegetation, or combinations thereof.

4. The method of claim 1 wherein said IRT temperature data and said digital image are collected multiple times within said target control area.

5. The method of claim 1 wherein said vegetation is selected from the group consisting of field crops, vegetables, fruits and fruit trees, turf grass, golf courses, urban landscapes and horticultural crops.

6. The method of claim 1 further comprising initiating irrigation if the vegetation is water stressed.

7. The method of claim 6 wherein said irrigation is provided using a controllable irrigation system.

8. The method of claim 6 wherein said irrigation is provided using a field-traversing irrigation system.

* * * * *